(12) United States Patent
Morioka

(10) Patent No.: US 10,293,564 B2
(45) Date of Patent: May 21, 2019

(54) TIRE MOUNTING MACHINE

(71) Applicant: BRIDGESTONE CORPORATION, Tokyo (JP)

(72) Inventor: Atsuo Morioka, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 279 days.

(21) Appl. No.: 15/503,513

(22) PCT Filed: Jul. 30, 2015

(86) PCT No.: PCT/JP2015/071604
§ 371 (c)(1),
(2) Date: Feb. 13, 2017

(87) PCT Pub. No.: WO2016/039033
PCT Pub. Date: Mar. 17, 2016

(65) Prior Publication Data
US 2017/0239900 A1    Aug. 24, 2017

(30) Foreign Application Priority Data

Sep. 12, 2014    (JP) .................................. 2014-185785

(51) Int. Cl.
*B29D 30/06* (2006.01)
*B29C 33/02* (2006.01)
*B29C 35/04* (2006.01)

(52) U.S. Cl.
CPC .......... *B29D 30/0603* (2013.01); *B29C 33/02* (2013.01); *B29C 35/04* (2013.01); *B29D 30/0654* (2013.01); *B29D 30/0645* (2013.01)

(58) Field of Classification Search
CPC ............ B29D 30/0603; B29D 30/0645; B29D 30/0654; B29D 2030/0647
See application file for complete search history.

(56) References Cited

U.S. PATENT DOCUMENTS

| | | | | |
|---|---|---|---|---|
| 2,997,738 A | * | 8/1961 | Soderquist | B29D 30/0603 264/315 |
| 3,471,895 A | * | 10/1969 | Stoyanov | B29D 30/0603 264/315 |
| 4,035,117 A | * | 7/1977 | Nakagawa | B29D 30/0603 425/19 |
| 4,190,406 A | * | 2/1980 | Geck | B29D 30/0603 294/93 |

(Continued)

*Primary Examiner* — James P Mackey
(74) *Attorney, Agent, or Firm* — Oliff PLC

(57) ABSTRACT

A tire holding device of a tire mounting machine grasps the bead section of a green tire by chucking paddles and places the green tire around an upright cylindrical vulcanization bladder. A bladder device of the tire mounting machine expands the vulcanization bladder to press same against the inner surface of the green tire, and sets the green tire in a vulcanization-mold. On a lower portion of each chucking paddle, guide extensions are formed to extend in the two circumferential directions. Between adjacent chucking paddles, the guide extensions extend toward each other and constantly overlap each other to prevent the expanding vulcanization bladder from contacting the radially inner surface of the bead section and from stripping the non-vulcanized rubber of the green tire.

7 Claims, 12 Drawing Sheets

(56) References Cited

U.S. PATENT DOCUMENTS 4,279,438 A * 7/1981 Singh ................ B29D 30/0016
 294/195
4,597,729 A * 7/1986 Singh ................ B29D 30/0603
 425/150

* cited by examiner

TIRE MOUNTING MACHINE

TECHNICAL FIELD

The present invention relates to a tire mounting machine for mounting raw or green tires onto a vulcanization-mold.

BACKGROUND ART

When a raw or green tire is to be mounted onto a vulcanization-mold for molding the tire with vulcanization by using a vulcanization bladder, the bead section of the green tire is held internally by a holding device, which conveys the green tire around the vulcanization bladder on the vulcanization-mold. Then, the vulcanization bladder is inflated to be pressed against the internal wall of the green tire.

It is known that such a holding device for internally holding the bead section of a green tire is provided with a chucking device capable of being increased and decreased in diameter so as to cope with different rim diameters defined by the bead sections of various green tires (for example, refer to Patent Document 1).

PRIOR ART DOCUMENT

Patent Document

[Patent Document 1] JP S-53-046383 A

Patent Document 1 discloses a chucking device provided with a plurality of identical segmental chucking paddles disposed along an imaginary circular cylinder with equal circumferential spaces between adjoining paddles. The cylindrically arranged chucking paddles are capable of moving in unison radially outward and inward so that the chucking device can hold and release the tire bead section internally by increasing and decreasing the diameter of the segmental chucking paddles even when the rim diameter of the bead section changes.

Each of the segmental chucking paddles is provided at its lower end with a lip as an engagement claw. The lower end with the lip functions to internally hold the bead section of the green tire, and the chucking device with the chucking paddles conveys the green tire held thereby to the vulcanization-mold to position the green tire around the vulcanization bladder.

The upper end of the vulcanization bladder in the shape of an upright tube extending upward in the central space of the green tire is then lowered, and the vulcanization bladder is concurrently supplied thereinto with steam under pressure, whereby the vulcanization bladder is inflated radially outward against the internal surface of the green tire to be pressed against the same. Thus, the green tire is set in position in the vulcanization-mold. Vulcanization-molding operation is then performed in the state of the vulcanization bladder being pressed against the internal surface of the green tire after the vulcanization-mold is closed to enclose the green tire set in position.

DISCLOSURE OF THE INVENTION

Problem to be Solved by the Invention

When the vulcanization bladder is being expanded with the upper end thereof being lowered, the vulcanization bladder is stretched, sliding onto and along the internal surface of the bead section of the green tire held by the segmental chucking paddles.

In the chucking device disclosed in Patent Document 1, there are spaces between adjoining segmental chucking paddles. Therefore, in the state of the chucking paddles holding the bead section internally, there exist alternately internal areas of the bead section, covered by the lower portions of chucking paddles and hidden from the internal space of the tire, and internal areas of the bead section, exposed to the internal space of the tire. For this reason, when the vulcanization bladder is expanded and stretched onto and along the bead section internal surface and into the interior space of the green tire, some portions of the expanded vulcanization bladder are pressed in sliding motion against the exposed internal areas of the bead section, and peel the non-vulcanized rubber of low strength in the exposed bead section internal areas.

The present invention has been made in view of the foregoing, and the object of the invention is to provide a tire mounting machine which can prevent the expanding vulcanization bladder from pressing and contacting the internal areas of the tire bead section to thus prevent non-vulcanized rubber in the internal areas of the bead section from being peeled.

Means for Solving the Problem

To solve the above problem, the present invention provides a tire mounting machine comprising: a tire holding device including vertically oriented card-shaped chucking paddles arranged in side-by-side disposition to be included in an imaginary circular cylinder with a circumferential spacing between adjoining chucking paddles, in such a manner that the card-shaped chucking paddles are concurrently movable radially outward and inward to increase and decrease a diameter of the imaginary circular cylinder, the tire holding device being adapted to hold a green tire from inside the tire positioned around the tire holding device, when the diameter thereof is increased; and a bladder device provided with a tubular upright vulcanization bladder to be positioned in a center of a vulcanization-mold and adapted to be inflated by supply of a shaping gas thereinto, the tubular vulcanization bladder having a lower opening held and closed by a lower clamp ring and an upper opening held and closed by an upper clamp ring, the upper opening of the vulcanization bladder being movable vertically in a region above the lower clamp ring; wherein the tire holding device is operable to hold a bead section of the green tire by means of the chucking paddles and to carry the thus held green tire around the upright vulcanization bladder, while the bladder device is operable to inflate the vulcanization bladder by supplying the shaping gas into the vulcanization bladder concurrently with lowering of the upper clamp ring, thereby to cause the vulcanization bladder to be pressed against an internal surface of the green tire for setting the green tire in the vulcanization-mold: characterized in that: each of the chucking paddles has, on a lower portion thereof, guide extensions on two lateral sides thereof extending in circumferential directions; and the chucking paddles have their guide extensions protruding to reach the guide extensions of circumferentially adjoining chucking paddles in mutually and constantly overlapping disposition.

According to a preferred embodiment of the invention, the guide extensions protruding in the circumferential directions from the lateral sides of the chucking paddles have an arcuate shape of a same predetermined radius of curvature;

and the tire holding device has a maximum diameter of the green tire that can be held thereby, the maximum diameter being a diameter of an imaginary circular cylinder defined by the guide extensions of the chucking paddles by which the green tire is held.

According to another preferred embodiment of the invention, the guide extensions on one lateral sides of the chucking paddles overlap the guide extensions on the other lateral sides of the chucking paddles, on radially inner sides of the guide extensions on the other lateral sides with respect to the imaginary cylinder.

According to a further preferred embodiment of the invention, the chucking paddles are arranged such that radial movement of the chucking paddles in radial directions of the imaginary cylinder changes an outer diameter of the imaginary cylinder, and that the radial movement of the chucking paddles causes resilient deformation of the guide extensions.

Preferably, an urging element is provided to urge the chucking paddles into a basic attitude in which all the radially inner surfaces of the chucking paddles face a center axis of the imaginary cylinder to be constituted by the chucking paddles; and the urging element is operative to urge the chucking paddles in such mutual disposition that tip ends of the guide extensions on the one lateral sides of the chucking paddles are kept in constant sliding contact with radially inner surfaces of the guide extensions on the other lateral sides of the chucking paddles.

Preferably, the urging element is an annular spring member for urging the chucking paddles radially inward from radially outer side thereof; and the annular spring member is changeable in diameter in conformity with radial movement of the chucking paddles, so as to constantly exert a force urging the chucking paddles into the basic attitude.

Effect of the Invention

According to the present invention, each of the chucking paddles has, on a lower portion thereof, guide extensions on two lateral sides thereof extending in circumferential directions; and the chucking paddles have their guide extensions protruding to reach the guide extensions of circumferentially adjoining chucking paddles in mutually and constantly overlapping disposition. For this reason, when the chucking paddles are enlarged in diameter and hold the internal surface of the bead section of the green tire, the entire internal surface of the bead section is covered and hidden throughout the bead section circumference by the chucking paddles and the mutually overlapping guide extensions thereof, whereby the vulcanization bladder being deformed and expanded are guided by and pressed against the guide extensions, thus being prevented from contacting the bead section internal circumference. Thus, the non-vulcanized rubber in the bead section is prevented from being peeled or striped off the bead section internal surface.

The guide extensions protruding in the circumferential directions from the lateral sides of the chucking paddles have an arcuate shape of a same predetermined radius of curvature, and the tire holding device has a maximum diameter of the green tire that can be held thereby, the maximum diameter being a diameter of an imaginary circular cylinder defined by the guide extensions of the chucking paddles by which the green tire is held. The tire mounting machine can therefore handle green tires that have diameters smaller than the maximum diameter.

If an attempt is made to hold a green tire of a diameter greater than the maximum diameter by the tire mounting machine, the guide extensions will be positioned on an imaginary cylinder having a diameter greater than the maximum diameter. In this state, tip ends of the guide extensions positioned radially internally of the related adjoining guide extensions will protrude radially internally and possibly impair the expanding vulcanization bladder.

The guide extensions on one lateral sides of the chucking paddles overlap the guide extensions on the other lateral sides of the chucking paddles, on radially inner sides of the guide extensions on the other lateral sides with respect to the imaginary cylinder. Therefore, all the chucking paddles are on the same imaginary cylinder and are arranged in the same attitude, whereby identical chucking paddles can be used with resultant reduction in manufacturing costs.

The chucking paddles are arranged such that radial movement of the chucking paddles in radial directions of the imaginary cylinder changes an outer diameter of the imaginary cylinder, and that the radial movement of the chucking paddles causes resilient deformation of the guide extensions. Although the chucking paddles are radially movable, taking the same attitude, and have a simple structure having a small number of component parts, the mutually adjoining guide extensions thereof are constantly in overlapping disposition accompanied by resilient deformation, with tip ends of some guide extensions maintained in contact with the internal surfaces of the associated guide extensions and without radially internal protrusion of the tip ends. As a result, the vulcanization bladder is prevented from being impaired.

A reduced number of component parts and an improved simplicity of the tire mounting machine can thus be realized at reduced costs.

The urging element is provided to urge the chucking paddles into a basic attitude in which all the radially inner surfaces of the chucking paddles face a center axis of the imaginary cylinder to be constituted by the chucking paddles, and the urging element is operative to urge the chucking paddles in such mutual disposition that tip ends of the guide extensions on the one lateral sides of the chucking paddles are kept in constant sliding contact with radially inner surfaces of the guide extensions on the other lateral sides of the chucking paddles. According to this feature, when the chucking paddles are moved to cope with various diameters of green tires, the urging element functions to orient the chucking paddles such that the guide extensions on one lateral sides are kept in constant sliding contact with radially inner surfaces of the associated guide extensions. As a result, the tip ends of the chucking paddles on one lateral sides are prevented from protruding radially inward with resultant prevention of the tip ends impairing the vulcanization bladder.

The urging element is an annular spring member for urging the chucking paddles radially inward from radially outer side thereof, and the annular spring member is changeable in diameter in conformity with radial movement of the chucking paddles, so as to constantly exert a force urging the chucking paddles into the basic attitude. The annular spring member functions to orient the chucking paddles such that the guide extensions on one lateral sides are kept in constant sliding contact with the associated guide extensions on the radially outer side. As a result, the tip ends of the chucking paddles on one lateral sides are prevented from protruding radially inward with resultant prevention of the tip ends impairing the vulcanization bladder.

A tire mounting machine at low cost is thus provided having a simple structure with a reduced number of component parts and with a capability of preventing impair of the vulcanization bladder.

BEST MODE FOR CARRYING OUT THE INVENTION

Embodiments of the present invention will be described with reference to the drawings.

Figure 1:
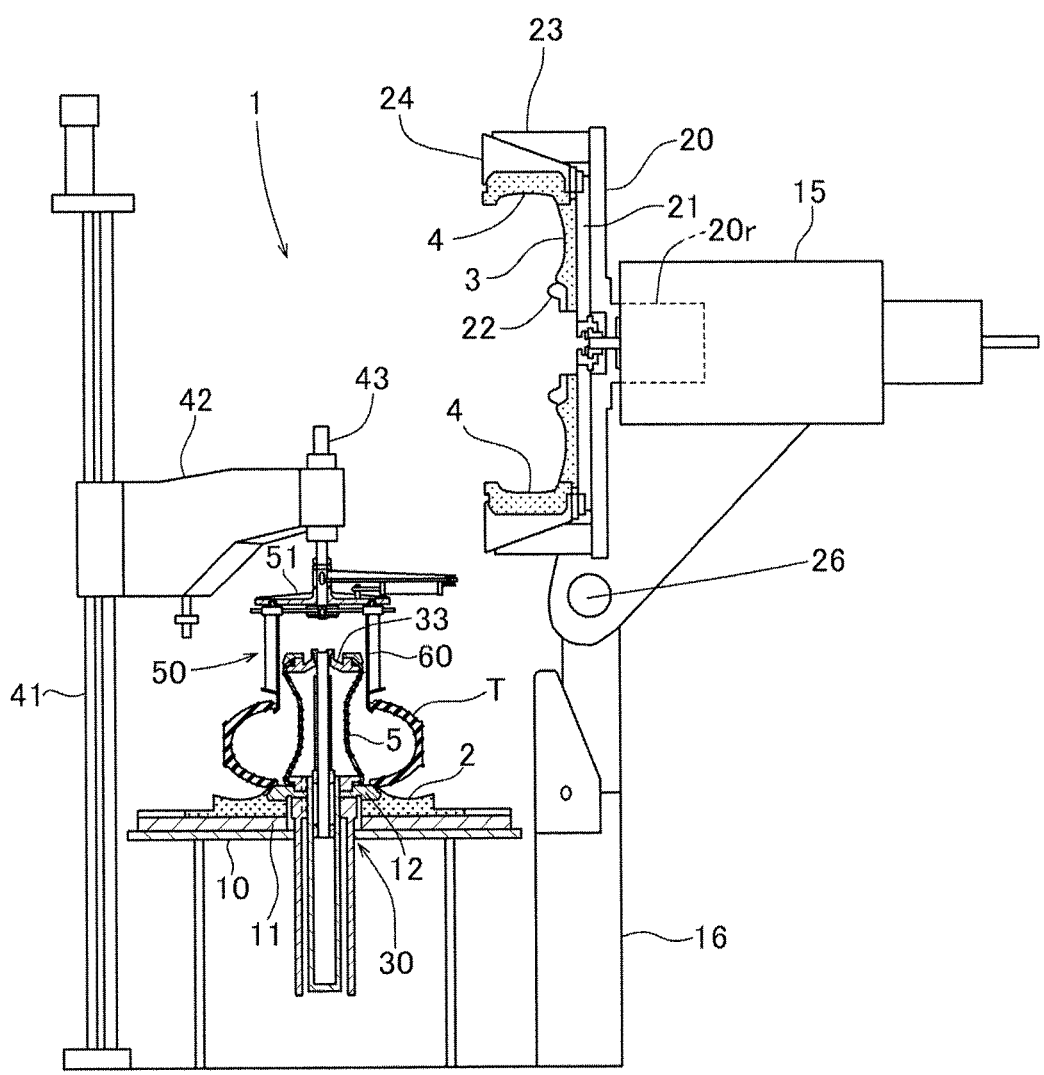
FIG. 1 is a general elevation showing an entire vulcanization-molding machine using a tire mounting machine according to the present invention.

FIGS. 1 to 9, inclusive, show an embodiment of the invention, among which FIG. 1 shows an entire elevational view of a vulcanization-molding machine 1 using a tire mounting machine according to the embodiment.

The vulcanization-molding machine 1 comprises an annular lower-side mold section 2, an upper-side mold section 3, and tread-mold sections 4 consisting of a plurality of expandable and shrinkable circumferentially-divided elements. These mold sections are adapted to enclose a raw or green tire T within a molding space which is formed by those mold sections and radially internally formed by a vulcanization bladder 5. Tire vulcanization-molding process is carried out within that molding space.

The lower-side mold section 2 is supported, with its molding surface facing upward, on a base 10 through a lower platen 11 in the shape of a hollow annular disc. The lower-side mold section 2 has an upwardly-directed opening around which a lower bead section ring 12 is fixedly fitted.

The upper-side mold section 3 is supported on a face of a disc 20 via an upper platen 21, and the disc 20 is fixedly secured to the free end of an drive rod 20r, which is projected from or retracted into an actuation and support device 15. The upper-side mold section 3 has a center opening in which an upper bead section ring 22 is fitted.

A cylindrical wall 23 is fixedly attached to, and projects from the circumferential portion of the disc 20. The cylindrical wall 23 has a tapered inner peripheral wall with which circumferentially separate mold holding members 24 are in sliding contact. The mold holding members 24 support the tread-mold sections 4, respectively. The actuation and support device 15 is supported on a support column 16 standing and located adjacent to the base 10, in a manner swingable about a pivot shaft 26.

FIG. 1 shows a waiting state in which the upper-side mold section 3 is in an attitude with its molding surface facing horizontally, at an obliquely upper position relative to the lower-side mold 2 supported on the base 10.

The base 10 has a circular opening formed coaxially with the central opening of the annular-disc-shaped lower platen 11. A bladder device 30 for operating a bladder is installed in the base 10 to extend through the circular opening and the central opening. The bladder device 30 acts on the expandable and shrinkable vulcanization bladder 5 made of rubber, which takes an approximately cylindrical or tubular shape except for the case of vulcanization-molding operation.

Figure 7:
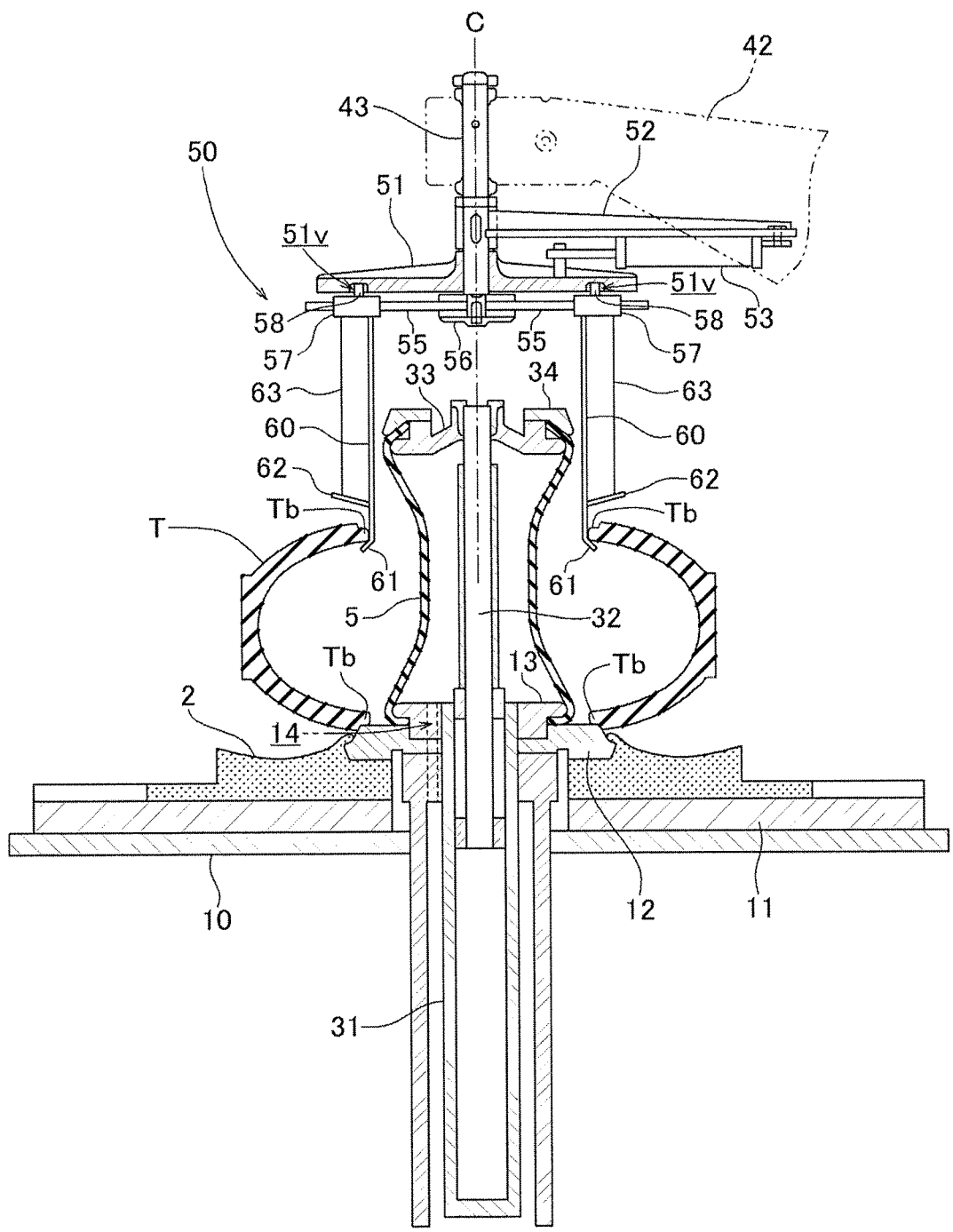
FIG. 7 is sectional view of the tire mounting machine in a tire mounting process in which a green tire is located around a vulcanization bladder.

Referring to FIG. 7, an operating cylinder 31 for up and down movement is fixedly secured at its upper end to the base 10 and extends downward therefrom. A cylinder rod 32 extends upward for up and down movement from the operating cylinder 31.

To the upper end of the cylinder rod 32 is fixed an umbrella-shaped plate 33 with its center supported on the cylinder rod 32. An upper clamp ring 34 is fixed to the upper surface of the outer peripheral edge portion of the umbrella-shaped plate 33 with the upper edge portion of the substantially cylindrical vulcanization bladder 5 tightly gripped between the umbrella-shaped plate 33 and the clamp ring 34.

A lower clamp ring 13 is fixedly secured to the upper surface of the lower bead section ring 12 fitted in the upper opening of the lower-side mold section 2. The lower clamp ring 13 tightly grips the lower edge of the vulcanization bladder 5 between the lower bead section ring 12 and the lower clamp ring 13.

The approximately cylindrical vulcanization bladder 5 has thus the lower edge thereof fixedly gripped between the lower clamp ring 13 and the lower bead section ring 12 fitted in the lower-side mold section 2, and has the upper edge thereof fixedly gripped between the umbrella-shaped plate 33 and the upper clamp ring 34. Therefore, the upper end of the vulcanization bladder 5 can be raised and lowered by up and down movement of the cylinder rod 32, with the lower end of the vulcanization bladder 5 immovably secured.

The internal space of the vulcanization bladder 5 is maintained in an air tight condition, and a shaping gas can be supplied into the vulcanization bladder 5 through a gas supply passage 14 passing through the lower bead section ring 12 and the lower clamp ring 13.

The vulcanization bladder 5 is expanded in radial directions about the center axis thereof by retracting the cylinder rod 32 downward to move the upper end portion of the vulcanization bladder 5 downward and by supplying the shaping gas into the vulcanization bladder 5.

The raw or green tire T is put about the vulcanization bladder 5 in approximately cylindrical shape, with a lower bead section Tb of the tire T placed on the lower bead section ring 12 fitted in the lower-side mold section 2. When the vulcanization bladder 5 is expanded radially outward, the vulcanization bladder 5 enters the internal annular recess of the tire T and is pressed against the annular inner wall, whereby the tire T is held by the vulcanization bladder 5.

A tire holding device 50 is provided to hold and carry the green tire T for the purpose of mounting the tire on the lower-side mold section 2.

Referring to FIG. 1, a column 41 stands at a predetermined position adjacent to the base 10, and a support arm 42 extends horizontally from the column 41. The support arm 42 has its proximal end fitted on the column 41 in a vertically slidable manner relative to the column 41. The support arm 42 is guided vertically by the column 41 and is rotatable about the column 41.

In the free end of the support arm 42 is provided a vertical support rod 43 which vertically penetrates the free end and is fixed thereto. The tire holding device 50 is supported by and suspended from the vertical support rod 43.

Figure 2:
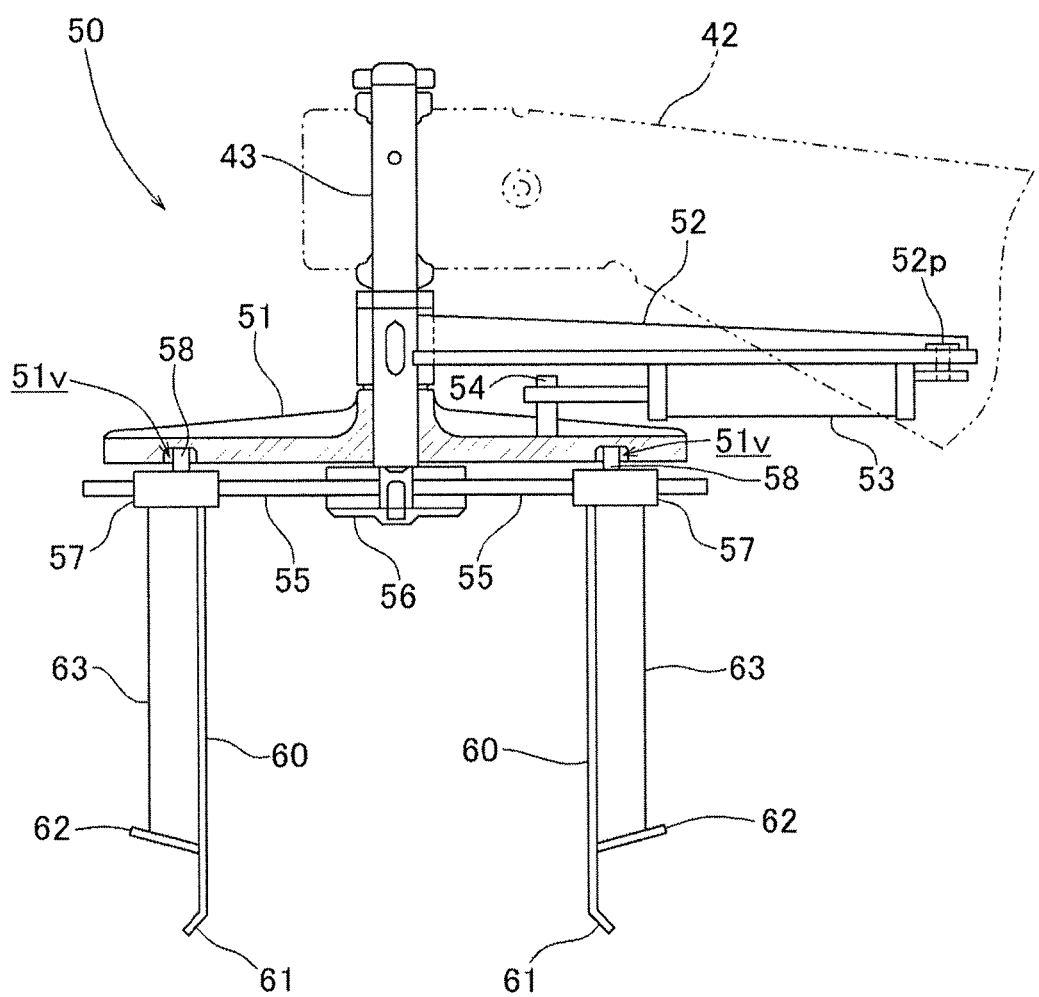
FIG. 2 is a side view, partly in section, of a tire holding device.
Figure 4:
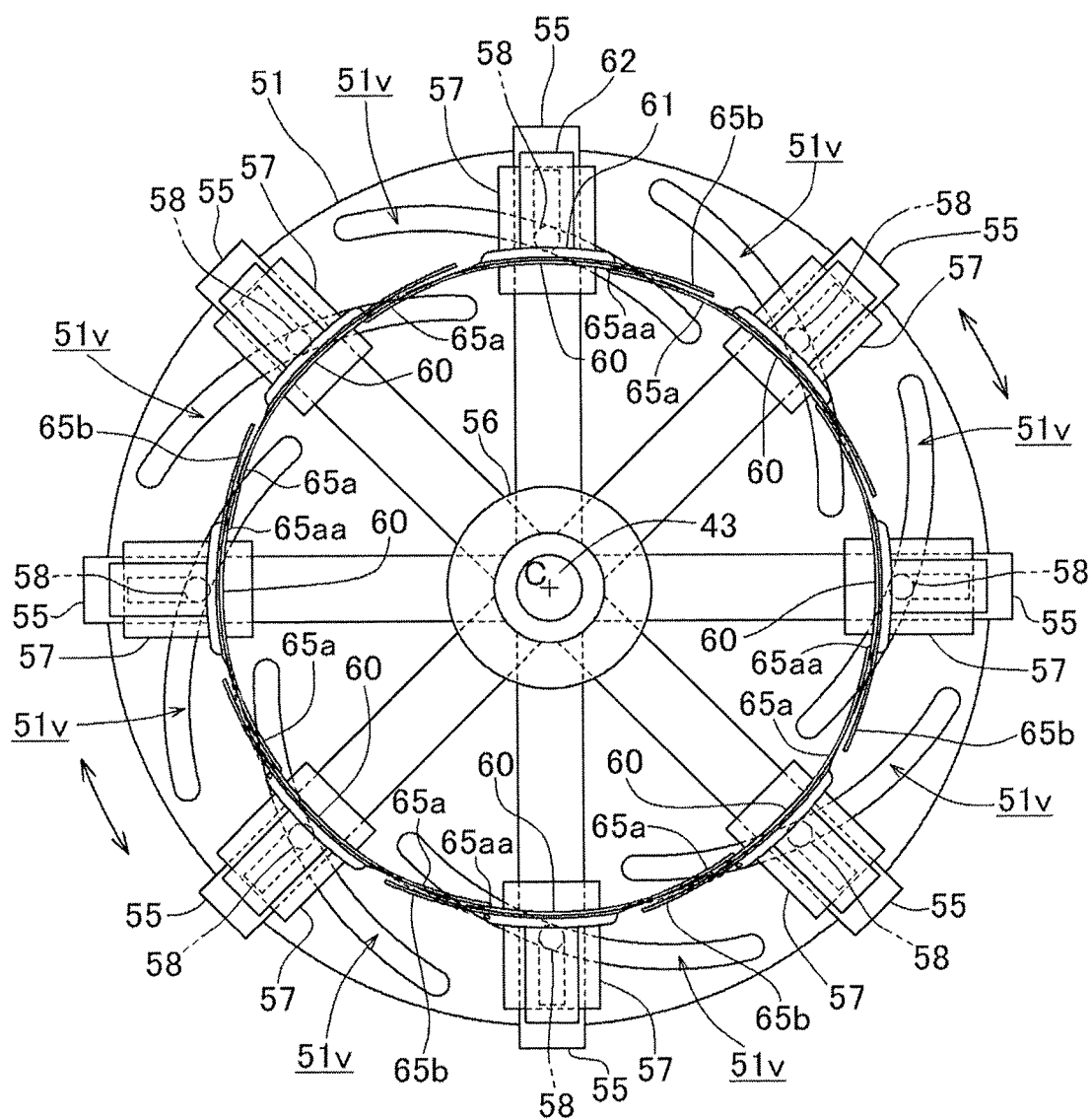
FIG. 4 is a bottom view of the tire holding device.
Figure 5:
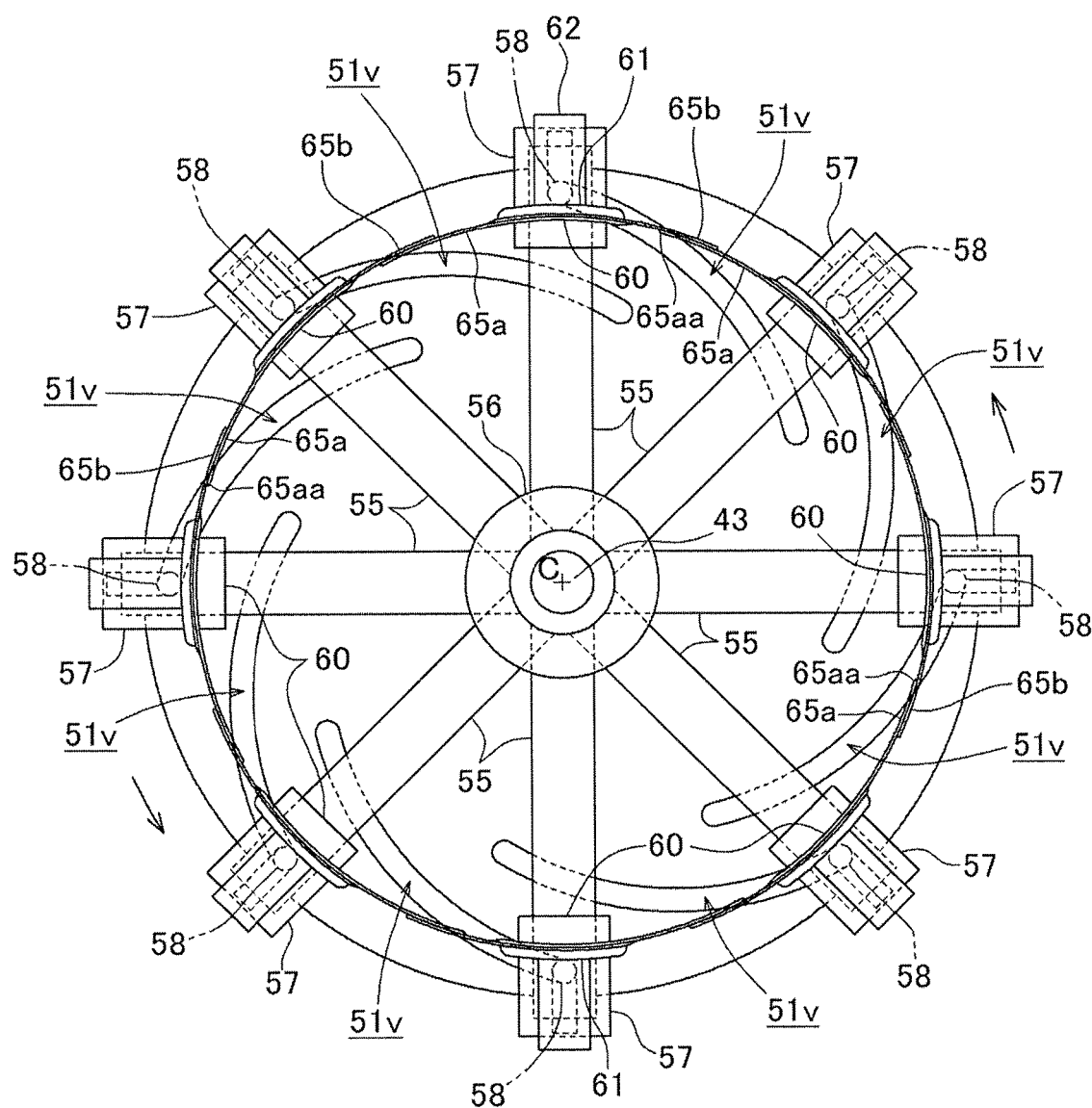
FIG. 5 is a bottom view of the tire holding device in which chucking paddles thereof are enlarged to a maximum diameter.

Referring to FIG. 2, the support rod 43 extends downward from the support arm 42 and a disc-shaped cam plate 51 is rotatably supported by the lower end of the support rod 43. As FIGS. 4 and 5 show, the disc-shaped cam plate 51 has a lower surface in which whirl-shaped spiral grooves 51v are formed in a circumferentially equidistant arrangement. The number of the spiral grooves 51v is eight, for example.

Figure 3:
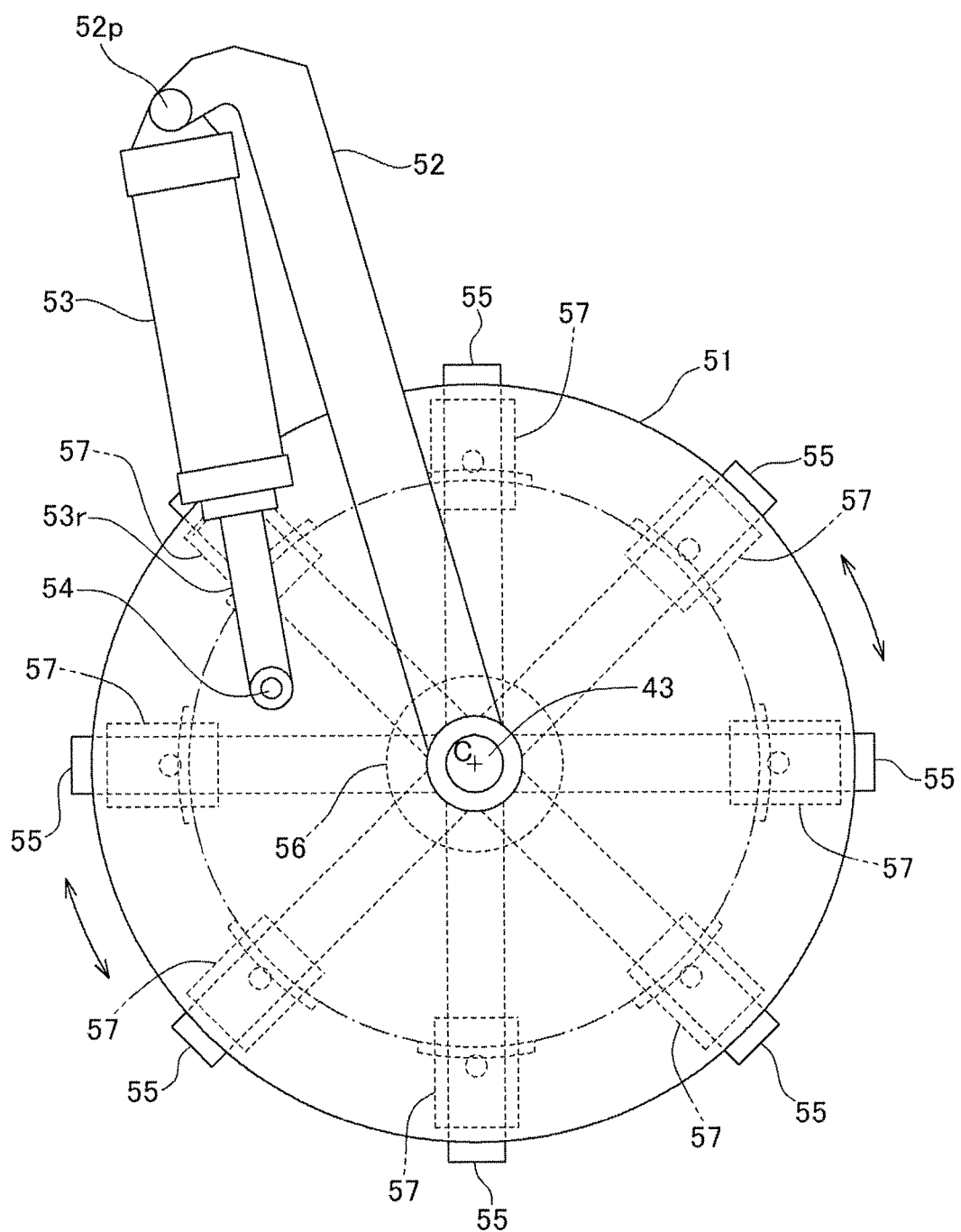
FIG. 3 is a plan view of the tire holding device.

As illustrated in FIGS. 2 and 3, a link arm 52 is provided between the support arm 42 and the disc-shaped cam plate 51 through which the vertical support rod 43 extends. The link arm 52 has its proximal end fixedly fitted on the support rod 43 to extend in a radial direction of the support rod 43. The distal end of the link arm 52 is joined with a pivot pin 52p to a proximal end of an operation cylinder 53 for rotation, while the free end of a cylinder rod 53r for advancing/retracting movement from and into the operation cylinder 53 is joined with a pivot pin 54 to the upper wall of the disc-shaped cam plate 51.

Therefore, advancing/retracting movement of the cylinder rod 53r made by actuation of the operation cylinder 53 causes the disc-shaped cam plate 51 to rotate around the vertical support rod 43 by way of the pivot pin 54.

The lower end of the vertical support rod 43 extends through the disc-shaped cam plate 51 and fixedly supports a hub member 56, from which guide bars 55, for example eight guide bars 55, integrally extend radially outward in cantilever fashion. The eight guide bars 55 are spaced apart equidistantly in the circumferential direction.

On each of the guide bars 55 is supported a slider 57 in the shape of a rectangular box in a manner slidable along the length of the guide bar 55. A guide pin 58 is erected on the upper surface of each of the sliders 57. The upper end of each guide pin 58 is in slidable engagement with each of the spiral grooves 51v Thus, when the operation cylinder 53 is actuated to cause rotational movement of the disc-shaped cam plate 51, the sliders 57 are shifted in radial directions of the support rod 43 along the guide bars 55 via the guide pins 58, respectively, which are in engagement with the spiral grooves 51v of the cam plate 51. The eight sliders 57 are concurrently moved in unison in radial directions and are constantly on a common circle around the support rod.

From each of the sliders 57 extends a chucking paddle 60 in the shape of a rectangular plate, in a vertically downward direction. The chucking paddle 60 is fixedly suspended downward from each of the sliders 57, which are constantly on a common circle, so that the eight chucking paddle 60 are arranged equidistantly in the circumferential direction along a common circle.

As seen in the bottom views of FIGS. 0.4 and 5, the chucking paddles 60 are curved in the shape of a circular arc in horizontal section, with the circular-arcuate inner surfaces thereof facing the center axis C of the vertical support rod 43. Each of the chucking paddles 60 is formed with an engaging claw 61 bent radially outward and downward.

Further, on the radially outer surface of each chucking paddle 60 is provided a bead section restraining plate 62 shown in FIG. 2, which projects radially outward from the chucking paddle 60 at a position slightly above the engaging claw 61. The upper slider 57 and the lower bead section restraining plate 62 are joined by a vertical reinforcing rib 63 protruding radially outward for reinforcing the chucking paddle 60.

As illustrated in FIGS. 4 and 5, each chucking paddle 60 has, at its lower portion, guide extensions 6a and 65b of arcuate cross section, which extend horizontally from the two sides of the paddle in circumferential directions. The guide extensions 6a and 65b are made of a resilient material and can be deformed resiliently. The one-side guide extension 6a extending in one circumferential direction from the one side of the chucking paddle 60 constantly overlaps the other-side guide extension 6b extending in the other circumferential direction from the other side of the neighboring chucking paddle 60. The one-side guide extension 6a is on the radially inner side (the side near the center) of the other-side guide extension 6b.

Since the eight chucking paddles 60 are constantly arranged on a common imaginary circle at circumferentially equally spaced-apart disposition, the guide extensions 65a and 65b protruding on the two sides of each chucking paddle 60 are superposed on the guide extensions 65b and 65a protruding on the two sides of the adjoining chucking paddles 60, so that the eight chucking paddles 60 and their guide extensions 65a and 65b are located along a common imaginary circle and constitute substantially a circular cylinder.

When the disc-shaped cam plate 51 is rotated as a result of the operation of the operation cylinder 53, the sliders 57 are shifted in the radial directions along the guide bars 55. The radial shifting movements of the sliders 57 cause radial movements of the chucking paddles 60, whereby the radius of the circular cylinder made up of the eight chucking paddles 60 and their guide extensions 65a and 65b is increased or decreased.

FIG. 5 shows a bottom view of the tire holding device 50, in which the common imaginary cylinder along which the eight chucking paddles 60 and their guide extensions 65a and 65b are located is enlarged to a maximum diameter. In the condition shown, the arcuate guide extensions 65a and 65b extending from each of the chucking paddles 60 have a radius of curvature equivalent to the radius of the imaginary circle having the maximum diameter.

Figure 6:
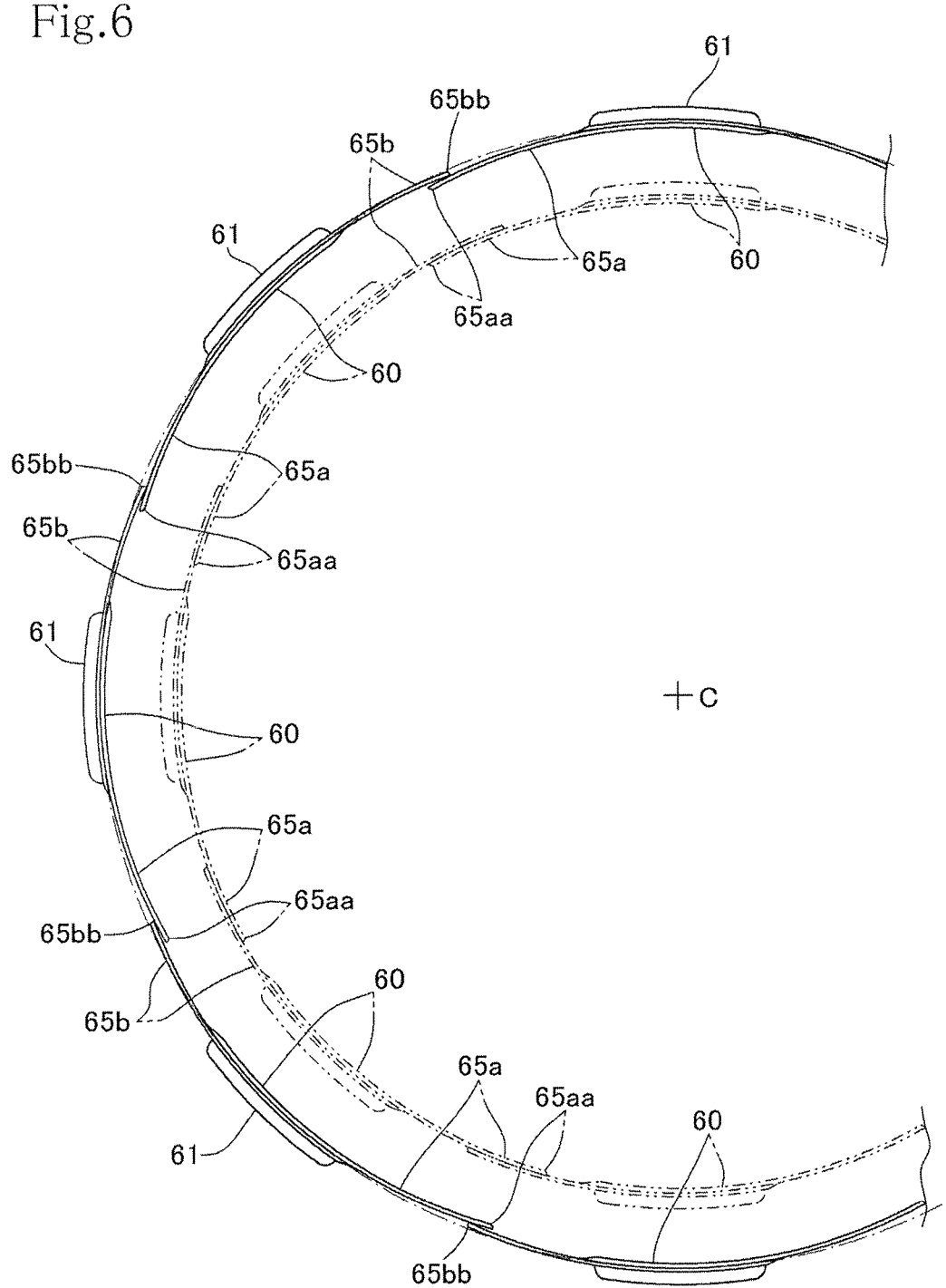
FIG. 6 is a bottom view showing only the chucking paddles and guide extensions thereof when the chucking paddles are enlarged to a diameter exceeding the maximum diameter.

When the chucking paddles 60 are positioned along the common imaginal cylinder of the maximum diameter as indicated in FIG. 5, substantially the entirety of the guide extension 65a on one side of each chucking paddle 60 overlaps substantially the entirety of the guide extension 65b on the other side of the adjoining chucking paddle 60 in such a state that both the overlapping guide extensions 65a and 65b have the same radius of curvature (see the two-dot chain lines in FIG. 6).

When the chucking paddles 60 are moved radially inward so that the radius of the common imaginal cylinder is reduced from the maximum diameter to a smaller diameter, the tip end 65aa of the guide extension 65a on the one side of each chucking paddle 60 is forced to slide on the radially inner surface of the adjoining guide extension 65b on the other side of the adjoining chucking paddle 60, so that the guide extension 65a on the one side is urged radially inward to undergo radially inwardly directed forced elastic deformation, as shown in FIG. 4.

The thus resiliently deformed guide extension 65a of each cucking paddle has its tip end 65aa kept in smooth contact with the radially inner surface of the adjoining guide extension 65b, as illustrated in FIG. 4.

Incidentally, if the chucking paddles 60 are moved radially outward beyond the state of constituting the maximum-diameter imaginal cylinder, the tip end 65*aa* of the guide extension 65*a* on the one side of each chucking paddle 60 is, as indicated in solid lines in FIG. 6, urged radially inward by the adjoining guide extension 65*b* on the other side of the adjoining chucking paddle 60, so that the sliding engagement between the adjoining extensions 65*a* and 65*b* is released and a trouble will occur to be described later.

For this reason, green tires T that can be handled by the tire holding device 50 of the tire mounting machine of the invention must have a maximum rim diameter equivalent to the maximum diameter of the imaginal cylinder constituted by the chucking paddles 60 and the guide extensions 65*a* and 65*b* thereof. This means that the tire mounting machine of the invention can handle green tires that have rim diameters smaller than the maximum diameter of the imaginal cylinder.

How green tires T having a rim diameter smaller than the maximum diameter of the imaginal cylinder are handled and held by the vulcanization-molding machine 1 by using the tire holding device 50 as described above will be described with reference to FIGS. 7 through 9, inclusive.

The green tire T to be handled is first put in a horizontal attitude in which one of the bead sections Tb thereof is positioned on the upper side. The tire holding device 50 is first moved above the tire T such that the engaging claws 61 at the lower ends of the eight chucking paddles 60 are engaged with the upper bead section Tb from inside by inserting the engaging claws 61 into the rim opening defined by the upper bead section Tb and then moving the chucking paddles 60 radially outward. In this state, the support arm 42 is lifted to raise the entirety of the tire holding device 50, so that the green tire T held by the tire holding device 50 is also raised. Meanwhile, the bladder device 30 is operated to raise the umbrella-shaped plate 33 to elongate the vulcanization bladder 5 in an upwardly protruding cylindrical shape. In this state, the tire holding device 50 is moved to a position above the center of the lower-side mold section 2 in which the center axis of the green tire T (the center axis C of the vertical support rod 43) is coincident with the center axis of the lower-side mold section 2.

Next, when the tire holding device 50 is moved downward together with the green tire T held thereby, the green tire T is placed around the vulcanization bladder 5 in the upwardly standing cylindrical shape, in such a state that the upstanding vulcanization bladder 5 extends upward through the upper and lower bead sections Tb and into the imaginary cylinder constituted by the eight chucking paddles 60 and the guide extensions 65*a* and 65*b* and that the lower bead section Tb of the green tire T is in abutment with the lower bead section ring 12 fitted in the upper opening of the lower-side mold section 2.

Figure 8:
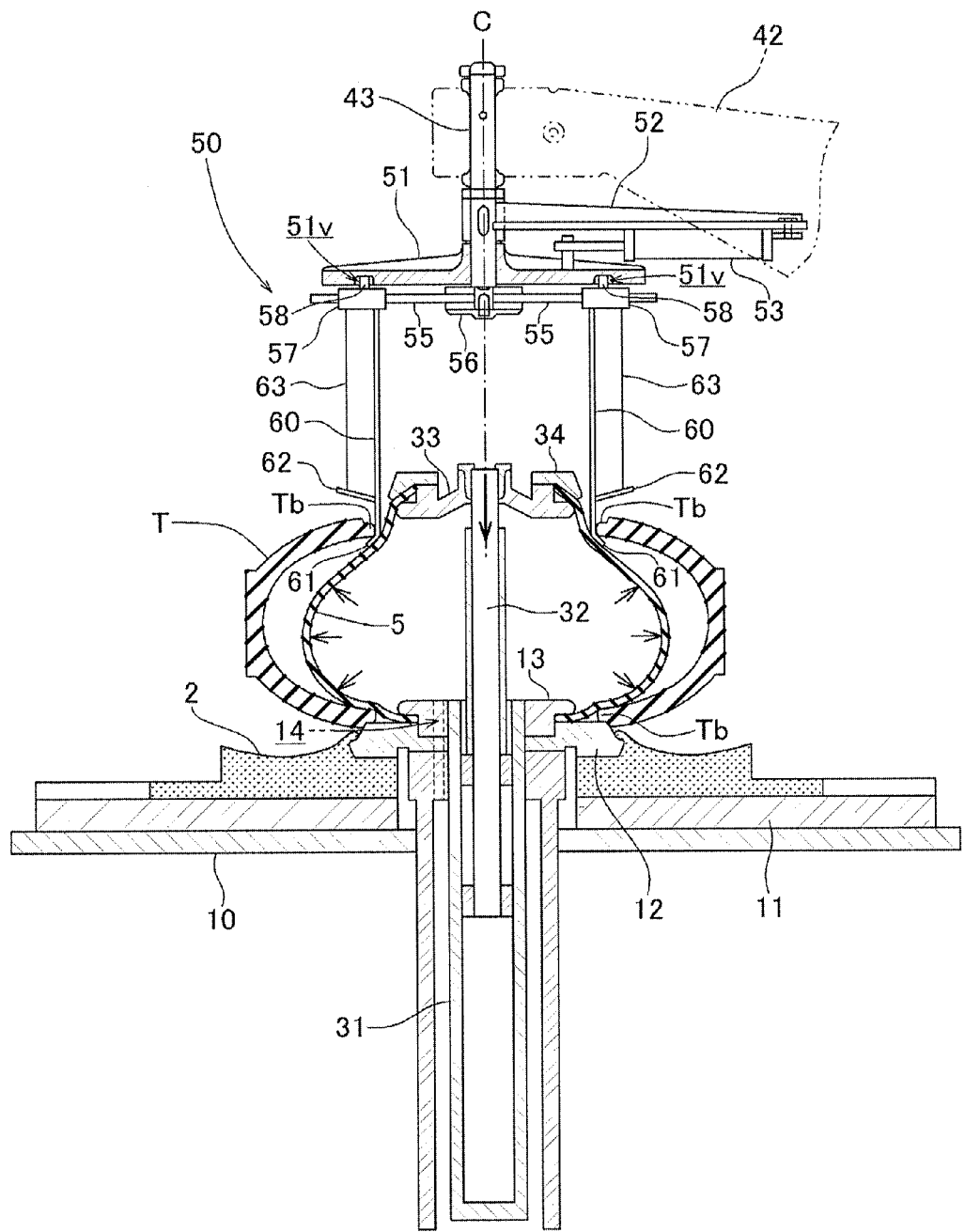
FIG. 8 is a sectional view of the tire mounting machine in a process in which the vulcanization bladder is inflated.

Then, the bladder device 30 is operated to lower the upper clamp ring 34 together with umbrella-shaped plate 33, and, at the same time, the shaping gas is supplied into the cylindrical vulcanization bladder 5 through the gas supply passage 14 so as to inflate the vulcanization bladder 5. As a result, as shown in FIG. 8, the vulcanization bladder 5 is expanded in radial directions in such a manner that the upper portion of the vulcanization bladder 5 expands radially outward to move into the annular recessed space in the tire T along the inner surface of the upper bead section Tb.

The upper bead section Tb of the green tire T is held internally by the engaging claws 61 at the lower ends of the eight chucking paddles 60, and the inner surface of the upper bead section Tb is internally covered by the eight chucking paddles 60 and by the mutually overlapping guide extensions 65*b* and 65*a*. It is prevented for this reason that the vulcanization bladder 5 is brought into direct contact with the inner surface of the upper bead section Tb. The vulcanization bladder 5 is in direct contact with the chucking paddles 60 and the mutually overlapping guide extensions 65*b* and 65*a*.

Therefore, an unvulcanized rubber portion of low strength, of the green tire in the region of the upper bead section Tb is prevented from being stripped off by frictional contact with the vulcanization bladder 5.

The vulcanization bladder 5 is expanded against the inner surface of the green tire T in a state of frictional contact with the chucking paddles 60 and the mutually overlapping guide extensions 65*b* and 65*a*, as mentioned above. Moreover, as shown in FIG. 4, the imaginary cylinder constituted by the eight chucking paddles 60 is made smaller than the maximum tire rim diameter, and the tip ends 65*aa* of the guide extensions 65*a* are urged into smooth resilient contact with the radially inner surfaces of the other guide extensions 65*b*. For this reason, it is prevented that the tip ends 65*aa* of the guide extensions 65*a* impair the vulcanization bladder 5 which is being inflated to contact the tip ends 65*aa*.

When it is attempted to hold a green tire having a rim diameter greater than the maximum rim diameter by the tire holding device 50, the chucking paddles 60 will be placed in such positions that the circle constituted by the guide extensions 65*a* and 65*b* is greater than the maximum diameter. Consequently, as shown in FIG. 6, the tip ends 65*aa* of the radially inner extensions 65*a* among the mutually overlapping guide extensions 65*a* and 65*b*, are directed radially inward to some degree. These tip ends 65*aa* tend to impair the vulcanization bladder 5 that is expanding radially outward to slidingly contact the guide extensions 65*a* and 65*b*.

For this reason, the tire mounting machine of the invention does not handle green tires that have a rim diameter greater than the maximum rim diameter.

Figure 9:
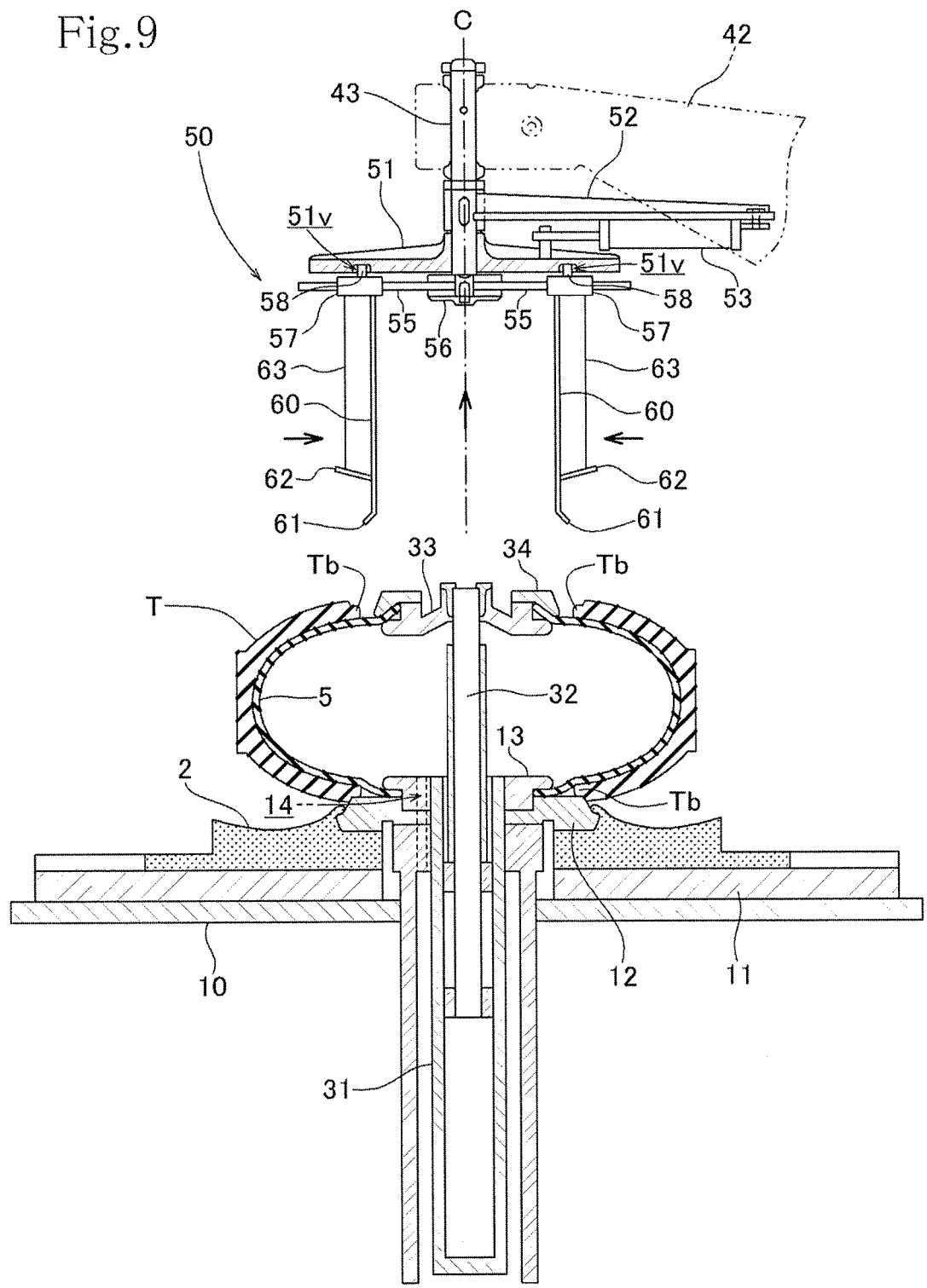
FIG. 9 is a sectional view of the tire mounting machine in a process in which the green tire is set on a vulcanization-mold.

As the vulcanization bladder 5 is further expanded, it is deformed deep into the recessed space of the green tire T, as shown in FIG. 9, so that the vulcanization bladder 5 is brought into pressed contact with almost the entire inner surface of the green tire T Then, the eight chucking paddles 60 that have grasped the upper bead section Tb of the green tire T are moved radially inward to reduce the diameter of the imaginary cylinder, so as to release the upper bead section Tb. When the tire holding device 50 is raised thereafter together with the chucking paddles 60, the state shown in FIG. 9 is obtained, and the operation of attaching or mounting the green tire T on the vulcanization-molding machine 1 is completed.

Thereafter, the tire holding device 50 is moved away from the position above the green tire, and the upper-side mold section 3 in the waiting position shown in FIG. 1 is swung downward about the pivot shaft 26, together with the actuation and support device 15, to move the upper-side mold section 3 to a position immediately above the green tire on the lower-side mold section 2. Concurrently with this, the tread-mold sections 4 are moved relative to each other to have a reduced diameter, whereby the green tire T is enclosed in the mold and the vulcanization-molding is carried out accompanied by heating.

In the tire holding device 50, the guide extensions 65*a* extending circumferentially on one side of each of the chucking paddles 60 are arranged to overlap the radially inner surface of the guide extensions 65*b* extending circumferentially on the other side of the adjoining paddle 60. Consequently, all the chucking paddles 60 are arranged on a common imaginary cylinder and in the same attitude. Therefore, the chucking paddles 60 can be of the same shape so that the manufacturing cost is reduced.

Radially outer and inner movements of the chucking paddles 60 result in enlargement and contraction of the imaginary cylinder defined by the chucking paddles 60, while the guide extensions 65*a* and 65*b* make resilient deformation. The sliders 57 are made to shift, together with the chucking paddles 60, in radial directions along the guide bars 55 via the guide pins 58 slidably engaging the spiral grooves 51*v* of the disc-shaped cam plate 51 in response to rotary movement of the cam plate. Even though there are a small kinds of component elements, the guide extensions 65*a* and 65*b* are kept at all times in mutually overlapping disposition with the tip ends 65*aa* being in resilient contact with the guide extensions 65*b*, and the tip ends 65*aa* of the guide extensions 65*a* do not protrude radially inward. Therefore, the tip ends 65*aa* are prevented from impairing the vulcanization bladder 5.

Thus, the tire holding device 50 is provided at reduced cost and with a reduced number of component parts, which tire holding device 50 does not impair the vulcanization bladder 5 in spite of its simple construction.

Next, a tire holding device 80 used in a tire mounting machine according to a further embodiment of the invention will be described with reference to FIGS. 10 to 12.

The same vulcanization-molding machine is also used in this embodiment except for the tire holding device 80.

Figure 10:
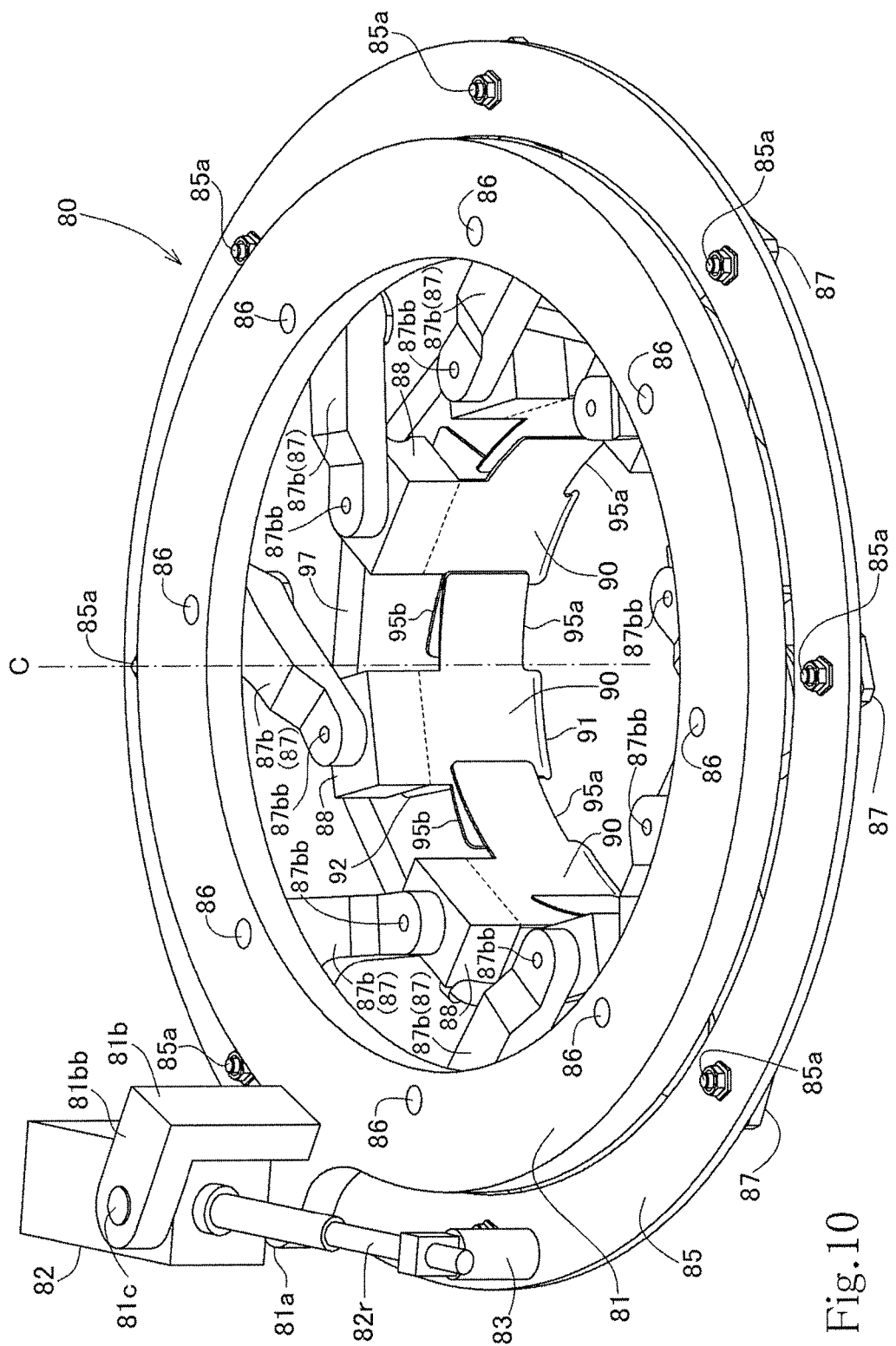
FIG. 10 is a perspective view, as seen from obliquely above, of a tire holding device according to another embodiment of the invention.
Figure 11:
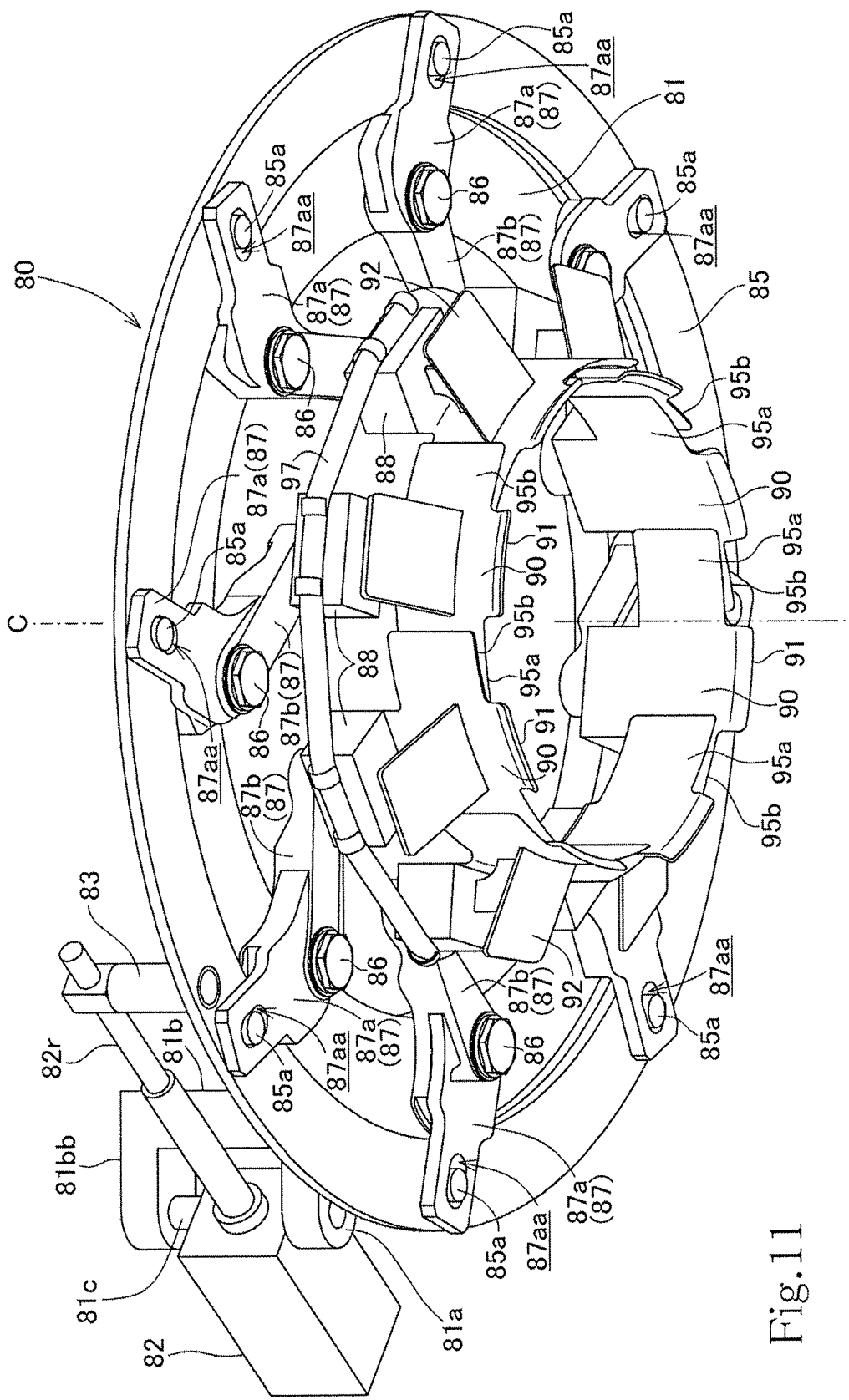
FIG. 11 is a perspective view, as seen from obliquely below, of the same tire holding device.

FIG. 10 is a perspective view of a principal portion of the tire holding device 80, as viewed from obliquely above the same, and FIG. 11 is a perspective view of the principal portion of the tire holding device 80, as viewed from obliquely below the same.

As shown, a stationary annular member 81 and a rotatable annular member 85 greater in diameter than the stationary annular member 81 are arranged around a common center axis C, with the stationary annular member 81 being positioned at a height level different from the rotatable annular member 85.

Both the stationary and rotatable annular members 81 and 85 are in the shape of a relatively thin annular strip-shaped plate. The outer diameter of the stationary annular member 81 is substantially equal to the inner diameter of the rotatable annular member 85. The stationary annular member 81 is at a level higher than the rotatable annular member 85.

The stationary annular member 81 is supported on an arm (not shown) capable of being horizontally moved and being raised or lowered. The rotatable annular member 85 is supported by the stationary annular member 81 to be rotatable relative to the same.

Referring to FIG. 10, a part of the stationary annular member 81 protrudes radially outward to form a protruding support 81*a* supporting an operation cylinder 82 thereon. On the other hand, an upstanding support member 81*b* is erected on the stationary annular member 81, which support member 81*b* is formed with a horizontal arm portion 81*bb* extending to a region above the protruding support 81*a*. A pivot shaft 81*c* is passed through both the protruding support 81*a* and the horizontal arm portion 81*bb*, and the operation cylinder 82 is supported by the pivot shaft 81*c* in a horizontally swingable manner.

The operation cylinder 82 pivotally supported on the stationary annular member 81 has a cylinder rod 82*r*, which has its free end slidabably connected to a protrusion 83 erected on the upper surface of the rotatable annular member 85.

Therefore, when the cylinder rod 82*r* of the operation cylinder 82 on the stationary annular member 81 advances or retracts, the rotatable annular member 85 is rotated via the protrusion 83.

The stationary annular member 81 has downwardly projecting pivot shafts 86, for example, eight pivot shafts, indispositions spaced apart circumferentially of the annular member 81. On each of the pivot shafts 86 is pivotably connected a proximal end of a link member 87, which proximal end is bent at an obtuse angle relative to the rest of it. The link member 87 is swingable about the pivot shaft in the space under the stationary annular member 81.

Each of the link members 87 has a radially outwardly extending outer arm 87*a* extending along the lower surface of the rotatable annular member 85. The outer arm 87*a* is formed at its distal end portion an elongated hole 87*aa*. A pin 85*a* protruding downward from the rotatable annular member 85 is fitted in the elongated hole 87*aa* for engagement.

Each of the link members 87 has a radially inwardly extending inner arm 87*b*. The distal end of the inner arm 87*b* has a downwardly extending pivot pin 87*bb* by which a paddle supporting member 88 of rectangular-box shape is supported in a horizontally swingable manner. All the paddle supporting members 88 are supported by the link members 87 of the same shape, respectively, and are constantly on a common imaginary circle. From each of the paddle supporting members 88 downwardly extends a card-shaped chucking paddle 90. All the chucking paddles 90, for example, eight in number, are provided on a common imaginary circle at circumferentially equally-spaced disposition.

When the operation cylinder 82 is actuated to advance and retract the cylinder rod 82*r*, the rotatable annular member 85 is rotated relative to the stationary annular member 81, and the link members 87 are swung by way of the engagement between the elongated holes 87*aa* and the pins 85*a*, so that the paddle supporting members 88 pivotally supported by the distal ends of the inner arms 87*b* are moved together with the chucking paddles 90. Thus, the chucking paddles 90 are moved radially inward or outward, whereby the imaginary circular cylinder defined by the eight chucking paddles 90 is enlarged or reduced in diameter.

Each of the chucking paddles 90 has an arcuate cross section as viewed from below, and is formed with an engaging claw 91 along the lower edge of the same. At a somewhat higher position than the engaging claw 91, the radially outer surface of each chucking paddle 90 is provided with a bead section restraining plate 92 protruding radially outward.

From the lower region of each of the chucking paddles 90 extend guide extensions 95*a* and 95*b* on the two lateral sides of each chucking paddle 90. The guide extensions 95*a* and 95*b* are in a circular arcuate shape and have the same radius of curvature as each chucking paddle 90. The guide extensions 95*a* and 95*b* defines a common cylindrical plane with each chucking paddle 90.

The guide extensions 95*a* and 95*b* in this embodiment need not be resiliently deformable.

An annular spring member 97 as an urging element is provided to tighten, from radially outside, the eight paddle supporting members 88 supporting the eight chucking paddles 90.

The annular spring member 97 is constructed by joining together elongated coil springs into an annular chain. The diameter of the annular spring member 97 can be increased by resiliently increasing the length of each coil spring. The annular spring member 97 thus expanded in diameter is fitted around the eight paddle supporting members 88 to tighten the same from radially outside.

The paddle supporting members 88 are swingably supported on the distal ends of the inner arms 87*b* of the link members 87. Therefore, the chucking paddles 90 and their guide extensions 95*a* and 95*b* supported on the paddle supporting members 88 are allowed to freely face in different directions. This is however restricted by the tightening of the paddle supporting members 88 from radially outside, and all the chucking paddles 90 are constantly urged to face the center axis C of the imaginary cylinder.

In the eight chucking paddles 90 thus disposed in annular arrangement, the guide extension 95*a* on one lateral side of each chucking paddle 90 constantly overlaps the inner surface (facing the center axis) of the guide extension 95*b* on the other lateral side of the adjoining chucking paddle 90.

Figure 12:
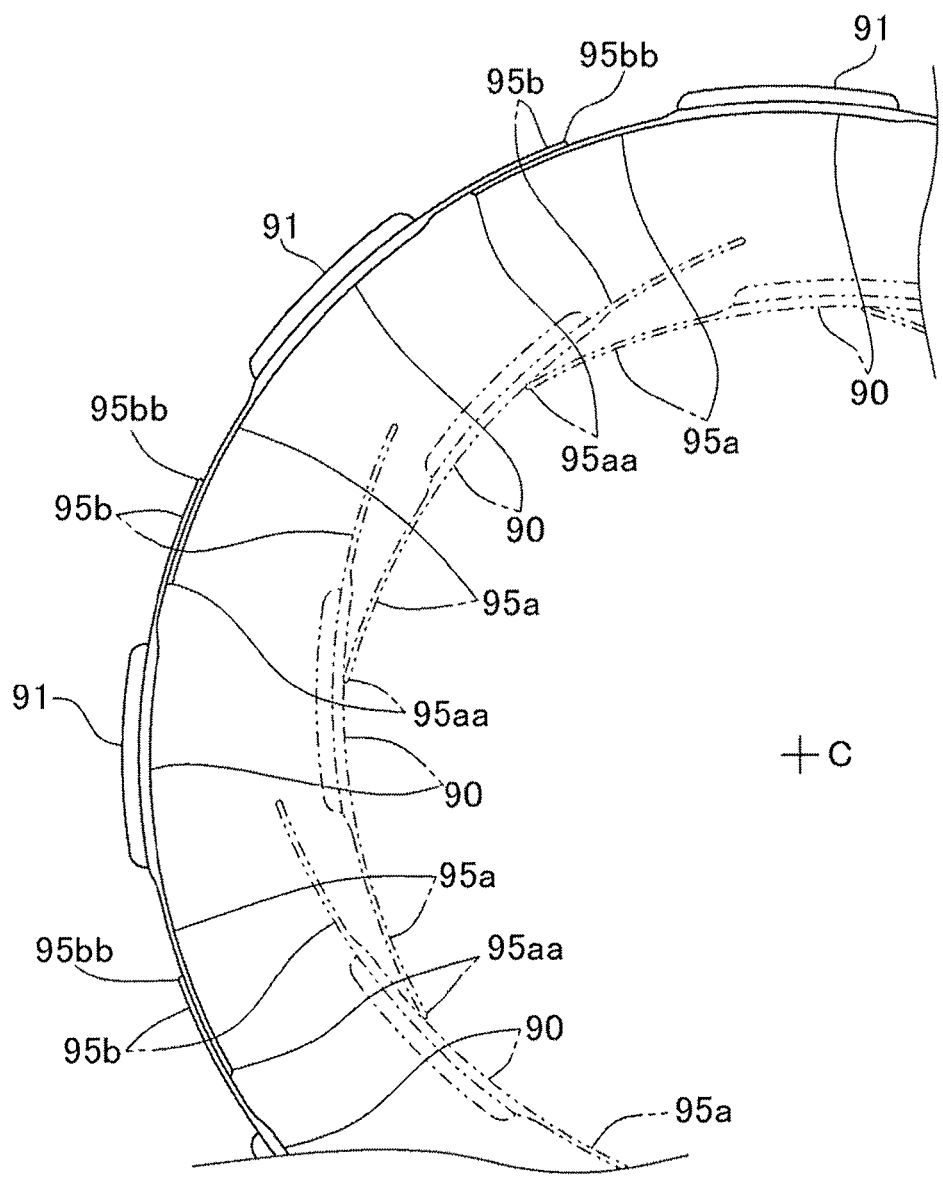
FIG. 12 is a fragmentary bottom view showing only chucking paddles and the guide extensions thereof in a state of the chucking paddles expanded to maximum diameter positions and in a state of being reduced in diameter.

FIG. 12, a bottom view of the tire holding device 80, shows only the chucking paddles 90 and the associated guide extensions 95*a* and 95*b*. These paddles 90 and the guide extensions 95*a* and 95*b* are shown in solid lines in a state in which the imaginary cylinder constituted by the paddles 90 and the guide extensions 95*a* and 95*b* has a maximum diameter.

The guide extensions 95*a* and 95*b* extending from the associated chucking paddle 90 have a radius of curvature equal to the radius of the imaginary cylinder with the maximum diameter.

A basic attitude of the chucking paddles 90 is assumed to be an attitude in which the radially inner surfaces of the guide extensions 95*a* and 95*b* face the center axis C of the imaginary cylinder of the eight chucking paddles 90. When the chucking paddles 90 are positioned such that their adjoining guide extensions 95*a* and 95*b* are not in mutually overlapping and mutually force-exerting state and when the annular spring member 97 exerts its resilient tightening force, then the middle portions of the chucking paddles 90 will all face the center axis C exactly, and the middle portions of the arcuate surfaces of the guide extensions 95*a* and 95*b* will also face the center axis C. This state is the basic attitude.

In reality, adjoining guide extensions 95*a* and 95*b* of the chucking paddles 90 are in mutually overlapping state, so that the chucking paddles 90 are out of the basic attitude in which the chucking paddles 90 all face the center axis C. The annular spring member 97 functions to exert an urging force to attain the basic attitude in which all the chucking paddles 90 face the center axis C.

Because of the exerted urging force, the guide extensions 95*a* on one lateral sides of the chucking paddles 90 are caused to overlap, from radially inner side, and radially outwardly urge the guide extensions 95*b* on the other lateral sides of the chucking paddles 90.

When the chucking paddles 90 are on the imaginary cylinder of a maximum diameter, the guide extensions 95*a* overlap the guide extensions 95*b* with all their overlapping portions in face-to face contact with each other (see the solid lines in FIG. 12).

When the chucking paddles 90 are moved radially inwardly to reduce the diameter from the maximum diameter, the attitudes of the chucking paddles 90 are inclined to a large degree, as shown in the two-dot chain lines in FIG. 3, in such a manner that the tip ends 95*aa* of the guide extensions 95*a* on one sides of the chucking paddles 90 are in sliding contact with the inner surfaces of the guide extensions 95*b* on the other sides of the chucking paddles 90. In such a state, the annular spring member 97 functions to exert an urging force to force the chucking paddles 90 to face the center axis C (to return to the basic attitude), whereby the tip ends 95*aa* of the guide extensions 95*a* are urged into face-to-face contact with the inner surfaces of the guide extensions 95*b*.

It is thus possible to maintain a state in which the tip ends 95*aa* of the guide extensions 95*a* are in face-to-face contact with the inner surfaces of the guide extensions 95*b*.

The engaging claws 91 at the lower edges of the eight chucking paddles 90 operate to engage the upper bead section Tb of the green tire T from inside. Then, the inner peripheral surface of the upper bead section Tb is covered by the eight chucking paddles 90 and the mutually overlapping guide extensions 95*a* and 95*b*. For this reason, the vulcanization bladder 5 can be expanded into the recess of the green tire T without directly touching the inner peripheral surface of the upper bead section Tb in such a manner that the vulcanization bladder 5 is brought into direct contact with the chucking paddles 90 and the mutually overlapping guide extensions 95*a* and 95*b*.

It is prevented therefore that un-vulcanized rubber of low strength, constituting the bead sections Tb of the green tire T, is stripped off by the vulcanization bladder 5.

The annular spring member 97 exerting a radially inwardly urging force to the eight chucking paddles 90 via the paddle supporting members 88 operates to increase or decrease its diameter in accordance with the movements of the chucking paddles 90 so as to return the chucking paddles 90 into the basic attitude facing the center axis C. This is a simple construction made up of a small number of component parts, which enables the tip ends 95*aa* of the radially inner guide extensions 95*a* to be in constant contact with the radially outer guide extensions 95*b* under the urging force of the annular spring member 97.

Thus, the tip ends 95*aa* of the guide extensions 95*a* are prevented from protruding toward the center axis (radially inward), whereby a tire mounting machine capable of preventing the vulcanization bladder 5 from being impaired is provided at low cost.

In the second embodiment of the invention, as is the case also in the first described embodiment of the invention, if the chucking paddles 90 are moved radially outward to such degree that the diameter of the imaginary cylinder exceed the maximum diameter, the outer surfaces near the tip ends 95*aa* of the guide extensions 95*a* on one sides of the chucking paddles 90 are pressed radially inward by the tip ends 95*bb* of the guide extensions 95*b* on the other sides of the chucking paddles 90. This results in that the tip ends 95*aa* of the guide extensions 95*a* are caused to protrude radially inwardly and to be separated from the inner surfaces of the guide extensions 95*b*. The radially inward protrusion of the tip ends 95*aa* are dangerous because they impair the vulcanization bladder 5 expanding against the guide extensions 95*a*.

For this reason, the tire mounting machine of the invention does not handle green tires having a diameter greater than the maximum diameter.

The two embodiments of the tire mounting machine according to the present invention have been described above. The present invention is not limited to those embodiments, but can be practiced in various ways within the spirit and scope of the invention.

For example, "green tires" includes retreaded tires before vulcanization.

REFERENCE LETTERS

1 . . . Vulcanization-molding machine, 2 . . . Lower-side mold section, 3 . . . Upper-side mold section, 4 . . . Tread-mold sections, 5 . . . Vulcanization bladder, 10 . . . Base, 11 . . . Lower platen, 12 . . . Lower bead section ring, 13 . . . Lower clamp ring, 14 . . . Gas supply passage, 15 . . . Actuation and support device, 16 . . . Support column, 20 . . . Disc, 21 . . . Upper platen, 22 . . . Upper bead section ring, 23 . . . Cylindrical wall, 24 . . . Mold holding member, 30 . . . Bladder device, 31 . . . Operating cylinder, 33 . . . Umbrella-shaped plate, 34 . . . Upper clamp ring, 41 . . . Column, 42 . . . Support arm, 43 . . . Vertical support rod, 50 . . . Tire holding device, 51 . . . Disc-shaped cam plate, 52 . . . Link arm, 53 . . . Operation cylinder, 54 . . . Pivot pin, 55 . . . Guide bar, 56 . . . Hub member, 57 . . . Slider, 58 . . . Guide pin, 60 . . . Chucking paddle, 61 . . . Engaging claw, 62 . . . Bead section restraining plate, 63 . . . Reinforcing rib, 65a, 65b . . . Guide extension, 80 . . . Tire holding device, 81 . . . Stationary annular member, 82 . . . Operation cylinder, 83 . . . Protrusion, 85 . . . Rotatable annular member, 86 . . . Pivot shaft, 87 . . . Link member, 88 . . . Paddle supporting member, 90 . . . Chucking paddles, 91 . . . Engaging claw, 92 . . . Bead section restraining plate, 95a, 95b . . . Guide extension, 97 . . . Annular spring member.

The invention claimed is:

1. A tire mounting machine comprising:

a tire holding device including vertically oriented card-shaped chucking paddles arranged in side-by-side disposition to be included in an imaginary circular cylinder with a circumferential spacing between adjoining chucking paddles, in such a manner that the card-shaped chucking paddles are concurrently movable radially outward and inward to increase and decrease a diameter of the imaginary circular cylinder, the tire holding device being adapted to hold a green tire from inside the tire positioned around the tire holding device, when the diameter thereof is increased; and a bladder device provided with a tubular upright vulcanization bladder to be positioned in a center of a vulcanization-mold and adapted to be inflated by supply of a shaping gas thereinto, the tubular vulcanization bladder having a lower opening held and closed by a lower clamp ring and an upper opening held and closed by an upper clamp ring, the upper opening of the vulcanization bladder being movable vertically in a region above the lower clamp ring;

wherein the tire holding device is operable to hold a bead section of the green tire by means of the chucking paddles and to carry the thus held green tire around the upright vulcanization bladder, while the bladder device is operable to inflate the vulcanization bladder by supplying the shaping gas into the vulcanization bladder concurrently with lowering of the upper clamp ring, thereby to cause the vulcanization bladder to be pressed against an internal surface of the green tire for setting the green tire in the vulcanization-mold: wherein:

each of the chucking paddles has, on a lower portion thereof, guide extensions on two lateral sides thereof extending in circumferential directions; and the chucking paddles have their guide extensions protruding to reach the guide extensions of circumferentially adjoining chucking paddles in mutually and constantly overlapping disposition.

2. The tire mounting machine as defined in claim 1, wherein:

the guide extensions protruding in the circumferential directions from the lateral sides of the chucking paddles have an arcuate shape of a same predetermined radius of curvature; and the tire holding device has a maximum diameter of the green tire that can be held thereby, the maximum diameter being a diameter of an imaginary circular cylinder defined by the guide extensions of the chucking paddles by which the green tire is held.

3. The tire mounting machine as defined in claim 2, wherein the guide extensions on one lateral sides of the chucking paddles overlap the guide extensions on the other lateral sides of the chucking paddles, on radially inner sides of the guide extensions on the other lateral sides with respect to the imaginary cylinder.

4. The tire mounting machine as defined in claim 2, wherein the chucking paddles are arranged such that radial movement of the chucking paddles in radial directions of the imaginary cylinder changes an outer diameter of the imaginary cylinder, and that the radial movement of the chucking paddles causes resilient deformation of the guide extensions.

5. The tire mounting machine as defined in claim 3, wherein:

an urging element is provided to urge the chucking paddles into a basic attitude in which all the radially inner surfaces of the chucking paddles face a center axis of the imaginary cylinder to be constituted by the chucking paddles; and the urging element is operative to urge the chucking paddles in such mutual disposition that tip ends of the guide extensions on the one lateral sides of the chucking paddles are kept in constant sliding contact with radially inner surfaces of the guide extensions on the other lateral sides of the chucking paddles.

6. The tire mounting machine as defined in claim 5, wherein:

the urging element is an annular spring member for urging the chucking paddles radially inward from radially outer side thereof; and the annular spring member is changeable in diameter in conformity with radial movement of the chucking paddles, so as to constantly exert a force urging the chucking paddles into the basic attitude.

7. The tire mounting machine as defined in claim 3, wherein the chucking paddles are arranged such that radial movement of the chucking paddles in radial directions of the imaginary cylinder changes an outer diameter of the imaginary cylinder, and that the radial movement of the chucking paddles causes resilient deformation of the guide extensions.

* * * * *